Patented June 13, 1933

1,913,430

UNITED STATES PATENT OFFICE

ORVILLE E. CUSHMAN, OF BERKELEY, CALIFORNIA, ASSIGNOR TO STANDARD OIL COMPANY OF CALIFORNIA, OF SAN FRANCISCO, CALIFORNIA, A CORPORATION OF DELAWARE

WATERPROOFING COMPOUND AND PROCESS OF MAKING THE SAME

No Drawing.   Application filed September 1, 1927.   Serial No. 217,008.

The invention relates to a new type of bituminous emulsion for waterproofing purposes. Bituminous emulsions have long been employed in various forms of waterproofing, including not only the formation of an integral mix with hydraulic cement concrete but also in impregnating fabrics and as an application to surfaces. When used in hydraulic cement compositions such as concrete, it is necessary that the bituminous material or the bituminous emulsion be carried into or introduced into the concrete with the water used in mixing the concrete materials. The emulsion must, therefore, be of the oil-in-water type for in this form the waterproofing element or bituminous constituent is in the internal phase, i. e. its particles are finely dispersed, each one being surrounded by water, so that the emulsion becomes miscible with water in all proportions. Furthermore, by the employment of this type of emulsion any amount of water may be added thereto so that the separation of the particles of the bituminous constituent may be carried to any desired degree and the concentration and distribution of the waterproofing agent throughout the concrete thereby controlled.

It is evident that an emulsion of the type described may be mixed with the water element of a hydraulic cement mixture with the result that when the concrete has set and dried the bituminous constituent will be thoroughly dispensed throughout the finished material. A bituminous constituent not miscible with water would have a tendency to separate, thereby resulting in unequal distribution through the mixture, and consequent impairment of uniform waterproofing effect.

It is well known that certain soaps or salts produced by the reaction of oxides and/or hydroxides of polyvalent metals or alkaline earths with fatty acids such as oleic, stearic, palmitic or naphthenic possess unusual water-repellent characteristics and hence are often used in combination with bituminous or oil products to increase the waterproofing qualities of such products. Certain of these soaps when added to bituminous waterproofing compounds have been found to improve the performance of such compounds far out of proportion to the actual amount of soap used, and being soluble in oil there is no difficulty in securing the proper dispersal throughout a bituminous compound.

These soaps are insoluble in water, however, and therefore difficult to incorporate in aqueous mixtures, either in their natural state or dissolved in oil. This has limited their use to waterproofing where water solutions are not employed in manufacture or application. Their insolubility and water-repellent qualities make them difficult to incorporate in emulsions of the oil-in-water type such as may be used for surface application, saturation of fabrics and integral waterproofing of concrete. Furthermore, these water-repellent soaps have a tendency to form water-in-oil emulsions in the presence of water and if an attempt were made to incorporate them in oil-in-water bituminous emulsions such as are suitable for integral waterproofing of hydraulic cement mortar the latter emulsions would tend to "break" or invert to the opposite or unsuitable water-in-oil type.

An object of this invention is to disclose a process of incorporating an emulsifying agent of water-in-oil into an emulsion of opposite type.

An object is to disclose a process of incorporating a soap of a polyvalent metal or alkaline earth in an emulsion of an oil-in-water type.

An object is to disclose a process of using a water insoluble soap in a waterproofing composition miscible in water.

An object is to produce a waterproofing compound miscible in water and containing a soap of a polyvalent metal or alkaline earth.

Another object is to produce a bituminous waterproofing emulsion miscible in water, and containing a soap of a polyvalent metal or alkaline earth.

An object is to produce a bituminous waterproofing compound miscible with water and adapted for use in hydraulic cement composition.

An object of the invention is to provide a means of incorporating a novel waterproofing agent such as water-insoluble soap normally an emulsifier of the water-in-oil type into an emulsion of the oil-in-water type without causing a break-down of the emulsion.

Another object is to supply a bituminous emulsion for general waterproofing purposes which will possess superior waterproofing qualities without sacrifice of characteristics of an oil-in-water emulsion.

I have discovered that by proper manipulation such water-repellent and water-insoluble soaps of polyvalent metals (such as, for example, lead zinc or aluminum soaps) and/or alkaline earths (such as, for example, calcium or magnesium soaps) may be incorporated into emulsions of the oil-in-water type without changing the emulsion characteristics of such emulsions and therefore without affecting the miscibility of such emulsions with water in all proportions. This incorporation is effected by first dissolving or colloidally suspending the water-repellent soap in a bituminous substance with the aid of heat and agitation, and then adding an emulsifying agent and water, so as to form an emulsion with water in the external phase. The resultant product is a smooth emulsion of salve-like consistency which can readily be diluted with water to any extent desired. It is believed that the emulsion is of a compound type in which the water-repellent soap tends to form a water-in-oil emulsion within the oil-in-water emulsion of the finished product. At any rate, the normal tendencies of the water-insoluble soap are overcome and dominated by the oil-in-water combination so that the product may be used in the manner desired and still retain the inherent waterproofing qualities of the water-in-oil emulsifier. The water-repellent soap may thus be introduced into materials of an aqueous character, such as hydraulic cement mortars or concrete for the integral waterproofing of such mortar or concrete.

Where I have spoken of emulsifying agents, I mean to include any finely divided material or colloidal solution capable of going into the interface and producing a film of the required physical properties. I believe that such emulsifying agent should lower the surface tension of the interface more on the water side than on the oil side so as to produce the desired oil-in-water emulsion. I have used and prefer to use a colloidal clay such as bentonite and the like, although china clay, kaolin and water soluble or water-wetted gums may be used.

The following example will illustrate one method of preparing the product: Ten parts of aluminum palmitate are added to ninety parts by weight of heavy fuel oil maintained at approximately 300 degrees Fahrenheit, agitated until smooth and then allowed to cool. Twenty-five parts of this mixture are then added, with agitation, to a previously prepared mix of twenty-five parts of a finely divided bentonite clay and fifty parts of water by weight. A smooth emulsion is quickly formed, having a salve-like consistency.

The product thus formed is ready for use and is suitable for any purpose where the usual oil-in-water type of emulsion is specified, such as impregnation of fabrics, surface applications and general waterproofing, or it may be diluted with water before using. As an integral waterproofing agent for hydraulic concrete, five to twenty-five percent by weight of the particular waterproofing paste as above prepared on the weight of the Portland cement, has been successfully used.

It is not intended to limit the kind or proportion of the various ingredients used in carrying out the process, which will vary in accordance with the available materials and the resuts desired. The substance described as the hydrocarbon bituminous constituent may be chosen from any materials capable of forming oil-in-water emulsions, such as heavy petroleum oils, tars, sludge tars, natural or artificial asphalts, mineral waxes, coal tars, coal tar pitches or animal or vegetable oils, waxes or pitches or combinations of two or more of such substances. When heavy oils, pitches, asphalts, waxes or tars, solid or semi-solid at normal temperatures, are used, it may be necessary to liquefy the soap-bitumen mixture by heat before adding to the mixture of colloidal clay and water. From about five to thirty percent by weight of soap of a polyvalent metal or alkaline earth may be added to the hydrocarbon. Care should be taken that the temperature of the mixture is kept below that of the boiling point of water, to prevent ebullition when the mixtures are brought together. The emusion may be formed above 212° F., of course, if sufficient pressure is employed to prevent ebullition. Different colloidal clays or other emulsifying agents for the oil-in-water emulsion require different amounts of water to make a paste of proper consistency for emulsification, so each clay or other substance used should therefore be tried out experimentally prior to its use in commercial quantity. When the resulting waterproofing composition is a paste or salve, it may contain from twenty-five to eighty percent of water and the emulsifying agent, such as colloidal clay.

I claim:

1. A waterproofing composition miscible with water and particularly adapted for use in hydraulic cement compositions comprising an emulsion in which water is in the external phase and containing a bituminous material, said bituminous material containing the product of reaction between oxides and hydroxides of polyvalent and alkaline earth metals and naphthenic acid in solution therein said composition also containing colloidal clay and water in quantities sufficient to form an oil-in-water emulsion.

2. A waterproofing composition comprising an emulsion in which water is in the external phase and containing a bituminous material having a naphthenic soap of a polyvalent metal in solution therein and a finely divided colloidal clay, said colloidal clay being suspended in said emulsion in quantity sufficient to insure an emulsion of oil-in-water type.

3. A waterproofing composition miscible with water and adapted for use in hydraulic cement compositions, comprising an emulsion in which water is in the external phase and containing about 22.5 per cent of a petroleum oil having about 2.5 per cent of a naphthenic soap of a polyvalent metal in solution therein, about 25 per cent of a finely divided colloidal clay, and about 50 per cent of water.

4. A waterproofing composition comprising an emulsion in which water is in the external phase and consisting of between 25 per cent and 80 per cent of a suspension of bentonite in water, the bentonite being present in quantity sufficient to form an oil-in-water emulsion, the remainder consisting of a petroleum oil having a naphthenic soap of a polyvalent metal in solution therein.

5. A waterproofing composition comprising an emulsion in which water is in the external phase and consisting of between 25 per cent and 80 per cent of a suspension of bentonite in water, the bentonite being present in quantity sufficient to form an oil-in-water emulsion, the remainder consisting of a petroleum oil having a fatty acid soap of a polyvalent metal in solution therein.

Signed at Richmond, Cal., this 18th day of August 1927.

ORVILLE E. CUSHMAN.